(12) United States Patent
Theoret et al.

(10) Patent No.: US 11,859,767 B2
(45) Date of Patent: Jan. 2, 2024

(54) METHOD AND SYSTEM FOR REMOTELY MONITORING FLUID LEVELS

(71) Applicant: Centri Group Inc., South Lyon, MI (US)

(72) Inventors: Nicolas Oliver-Gabriel Theoret, Detroit, MI (US); Thomas Zagotta, South Lyon, MI (US)

(73) Assignee: Centri Group Inc., Brighton, MI (US)

( * ) Notice: Subject to any disclaimer, the term of this patent is extended or adjusted under 35 U.S.C. 154(b) by 155 days.

(21) Appl. No.: 17/307,335

(22) Filed: May 4, 2021

(65) Prior Publication Data

US 2021/0341107 A1 Nov. 4, 2021

Related U.S. Application Data

(60) Provisional application No. 63/101,536, filed on May 4, 2020.

(51) Int. Cl.
*F17C 13/02* (2006.01)
*H04W 4/80* (2018.01)
*G06Q 50/06* (2012.01)
*H04L 67/562* (2022.01)

(52) U.S. Cl.
CPC .......... *F17C 13/025* (2013.01); *F17C 13/028* (2013.01); *G06Q 50/06* (2013.01); *H04L 67/562* (2022.05); *H04W 4/80* (2018.02); *F17C 2221/035* (2013.01); *F17C 2250/032* (2013.01); *F17C 2250/034* (2013.01); *F17C 2250/0408* (2013.01); *F17C 2250/0626* (2013.01); *F17C 2265/06* (2013.01)

(58) Field of Classification Search
CPC ...... H04W 4/80; H04L 67/562; F17C 13/028; F17C 2221/035; F17C 2250/032; F17C 2250/034; F17C 2250/0408; F17C 2250/0626; F17C 2265/06; G06Q 50/06
USPC ................ 137/15.01, 15.03, 15.11, 393, 557
See application file for complete search history.

(56) References Cited

U.S. PATENT DOCUMENTS

| | | | |
|---|---|---|---|
| 6,502,461 B2 | 1/2003 | Keller | |
| 7,174,783 B2 | 2/2007 | McSheffrey, Jr. et al. | |
| 7,197,407 B2 * | 3/2007 | Schimnowski | G01F 1/28 702/45 |
| 7,295,919 B2 | 11/2007 | Humphrey | |
| 7,512,488 B2 | 3/2009 | Humphrey | |
| 7,937,215 B2 | 5/2011 | Humphrey | |
| 7,937,216 B2 | 5/2011 | Humphrey | |
| 8,096,177 B2 | 1/2012 | Burris | |

(Continued)

*Primary Examiner* — Angelisa L. Hicks
(74) *Attorney, Agent, or Firm* — WARNER NORCROSS + JUDD LLP

(57) ABSTRACT

A method for monitoring an amount of a commodity in a remote storage container via a system comprises: (i) measuring via a sensor the amount of the commodity in the remote storage container and outputting an analog or digital signal, wherein if the signal outputted by the sensor is an analog signal, the method further comprises converting the analog signal to a digital signal; (ii) packaging the digital signal into a data file; (iii) publishing via a wireless connection the data file to a message query telemetry transport (MQTT) broker for access by a user; (iv) receiving confirmation that the MQTT broker received the data file; (v) accessing by the user information from the data file; and (vi) repeating steps (i) to (v) after a predetermined time.

12 Claims, 7 Drawing Sheets

(56) References Cited

U.S. PATENT DOCUMENTS

| | | |
|---|---|---|
| 8,150,615 B2 | 4/2012 | Humphrey |
| 8,223,027 B2 | 7/2012 | Jenkins et al. |
| 8,504,294 B2 | 8/2013 | Humphrey |
| 8,798,913 B2 | 8/2014 | Humphrey |
| 9,454,856 B2 * | 9/2016 | Ahmad ................ F02D 19/025 |
| 9,878,897 B2 | 1/2018 | Rogers et al. |
| 9,911,095 B2 | 3/2018 | Mashburn et al. |
| 10,068,467 B1 | 9/2018 | Pennebaker, III |
| 10,210,696 B2 | 2/2019 | Bretthauer |
| 2001/0032506 A1 | 10/2001 | Keller |
| 2005/0056090 A1 | 3/2005 | McSheffrey, Jr. et al. |
| 2006/0015543 A1 | 1/2006 | Humphrey |
| 2006/0243347 A1 | 11/2006 | Humphrey |
| 2008/0033668 A1 | 2/2008 | Humphrey |
| 2009/0248325 A1 | 10/2009 | Humphrey |
| 2010/0241277 A1 | 9/2010 | Humphrey |
| 2011/0173128 A1 | 7/2011 | Humphrey |
| 2011/0247705 A1 | 10/2011 | Humphrey |
| 2012/0316915 A1 | 12/2012 | Humphrey |
| 2013/0275062 A1 | 10/2013 | Humphrey |
| 2016/0292632 A1 | 10/2016 | Mashburn et al. |
| 2018/0011694 A1 * | 1/2018 | Al-Fuqaha ................ G06F 8/36 |
| 2018/0225624 A1 | 8/2018 | Mashburn et al. |
| 2018/0376107 A1 * | 12/2018 | Shibaev ................ G08B 21/043 |
| 2019/0234786 A1 * | 8/2019 | Klicpera ................ G01M 3/26 |

\* cited by examiner

METHOD AND SYSTEM FOR REMOTELY MONITORING FLUID LEVELS

CROSS-REFERENCE TO RELATED APPLICATIONS

This application claims priority to and all advantages of U.S. Application No. 63/101,536, filed on 4 May 2020, the content of which is incorporated by reference herein.

FIELD OF THE INVENTION

This invention generally relates to a method of remote monitoring and, more specifically, to a method and system for remotely monitoring fluid levels in a storage tank.

BACKGROUND

Storage tanks are utilized in myriad applications for both residential and commercial purposes. For example, storage tanks are often utilized to store fluids (which may be liquids and/or gasses) for various end uses. Such storage tanks may be utilized in remote geographies, making it difficult to actively monitor fluid levels therein. As but one example, propane tanks are often utilized for commercial and residential purposes particularly where access to other public utilities is limited. Where other public utilities are limited, actively monitoring such fluid levels becomes even more problematic due to limited availability of power and internet. Simply stated, it's difficult to know when fluid levels necessitate service for refilling a storage tank.

As such, in many industries, a person periodically delivers additional fluid to storage tanks on a predefined schedule. While scheduled periodic delivery ensures that fluid levels do not drop to unacceptable levels, it brings significant cost and inefficiencies. For example, having a person travel to a remote location where fluid levels don't yet necessitate a fuel delivery adds significant cost and time to overall fluid management.

BRIEF SUMMARY

A method for monitoring an amount of a commodity in a remote storage container via a system is disclosed. The method comprises (i) measuring via a sensor the amount of the commodity in the remote storage container and outputting an analog or digital signal, wherein if the signal outputted by the sensor is an analog signal, the method further comprises converting the analog signal to a digital signal. The method further comprises (ii) packaging the digital signal into a data file. In addition, the method comprises (iii) publishing via a wireless connection the data file to a message query telemetry transport (MQTT) broker for access by a user. The method additionally comprises (iv) receiving confirmation that the MQTT broker received the data file. The method also comprises (v) accessing by the user information from the data file. Finally, the method comprises (vi) repeating steps (i) to (v) after a predetermined time.

A system capable of performing the method is also disclosed.

The system measures the level of a commodity in a storage container using a sensor, or combination of sensors. Information measured in regards to the system as well as sensor data can be transmitted via a cellular antenna in the system over a cellular network, where the information is published to a Message Query Telemetry Transport (MQTT) broker.

In one embodiment, the system includes and is powered by a solar cell which converts solar energy into electricity. The energy generated from the solar cell can be stored in an energy storage module.

In a specific embodiment, to power ON the system, a light blocking screen is removed from over the solar cell. Removal of this screen activates the solar cell, which in turn sends a signal to the power management module, and powers ON the system (including in initial set-up and calibration of the system).

In another specific embodiment, the system emits a Bluetooth Low Energy (BLE) signal that can be received by devices capable of receiving such a BLE signal, such as a mobile phone. This allows the system to be commissioned and initiates the MQTT publish cycle, and allows for a user to communicate with the system.

The system typically alternates between a sleep mode and a MQTT publish cycle mode at scheduled time intervals. These scheduled time intervals can be pre-programmed, transmitted, or determined by the system autonomously based on the balance of energy generation and energy consumption of the system.

During sleep mode, the system minimizes power consumption. To minimize power consumption, all processes are paused and saved in memory of the system. An internal time clock may be kept powered so the system may initiate the MQTT publish cycle at a scheduled time. The BLE antenna can also remain powered so that the system may exit the sleep mode via a BLE signal sent from the BLE transmitting device.

During the MQTT publish cycle, the system is fully powered and resumes internal processes. The system reads the information from the sensor, processes the sensor information, and packages the information into a data file, such as a JavaScript Object Notation (JSON) file. The data file is then transmitted via a cellular antenna of the system to the cellular network.

The system can manage its power consumption internally by monitoring energy generated from the solar cell and comparing it to the energy consumed. Based on this energy balance, the system may increase or decrease the frequency of MQTT publish cycles.

An objective of the system is to enable commodity distributors to accurately measure their customers' inventory levels and usage rates so they may efficiently schedule deliveries. Examples of commodities that may be monitored by the system include, but are not limited to, compressed gases, liquid fuels, liquid detergents, water, wood, beer, wine, and other ingestible, or non-ingestible liquids.

Another objective of the system is to alert a user of the commodity. When the level in the storage container reaches an undesired level, the user receives a notification via a mobile app. If the commodity is consumed or changing at abnormal rates, the user may also receive a notification via a mobile app. An example of this objective is a homeowner that runs low on propane which they use as a heating source.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
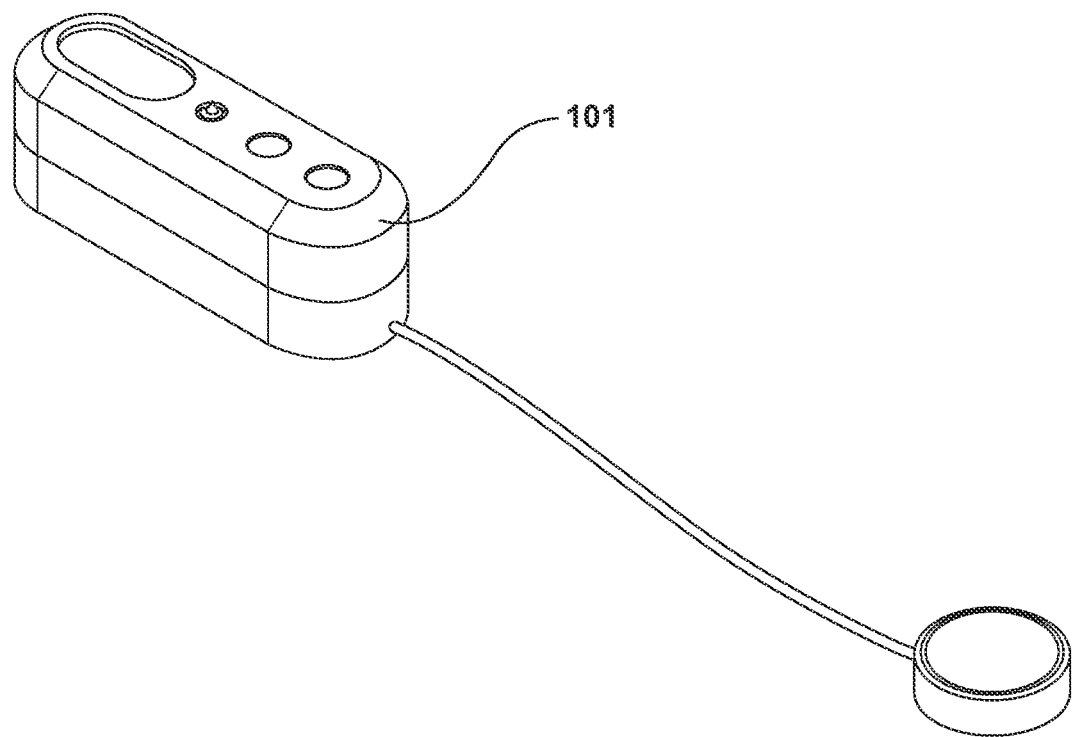
FIG. 1 is an isometric view of a monitoring system according to one embodiment of the invention.

Reference will now be made to the present system, examples of which are illustrated in the accompanying drawings. Wherever possible, the same reference numbers will be used throughout the drawings to refer to the same or like parts. One exemplary embodiment of a system, and in particular a solar powered connected monitoring system, is illustrated in FIG. 1 and is designated by reference number 101.

A method for monitoring an amount of a commodity in a remote storage container via the system is disclosed. The method comprises (i) measuring via a sensor the amount of the commodity in the remote storage container and outputting an analog or digital signal, wherein if the signal outputted by the sensor is an analog signal, the method further comprises converting the analog signal to a digital signal. The method further comprises (ii) packaging the digital signal into a data file. In addition, the method comprises (iii) publishing via a wireless connection the data file to a message query telemetry transport (MQTT) broker for access by a user. The method additionally comprises (iv) receiving confirmation that the MQTT broker received the data file. The method also comprises (v) accessing by the user information from the data file. Finally, the method comprises (vi) repeating steps (i) to (v) after a predetermined time. Exemplary embodiments and aspects of the system and method are described below with reference to the Figures.

Figure 2:
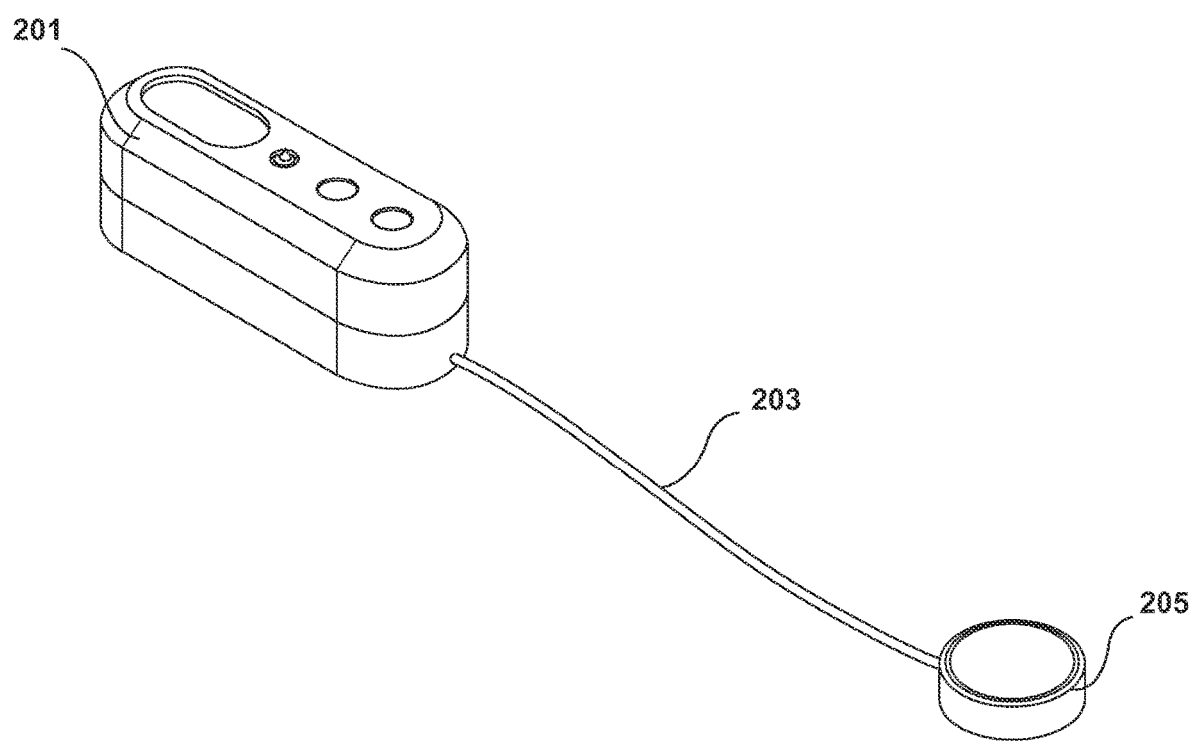
FIG. 2 is an isometric view of a monitoring system according to one embodiment of the invention and comprising a sensor, cable, and core system.

Illustrated in FIG. 2 is a core system 201 joined to the sensor 205 with an electrical cable 203 such that the sensor 205 is in communication with the core system 201 via the cable 203. The cable 203 is used to transmit an analog or digital signal from the sensor 205 to the core system 205. The core system 201 may be referred to as a device and is part of the system 101.

Figure 3:
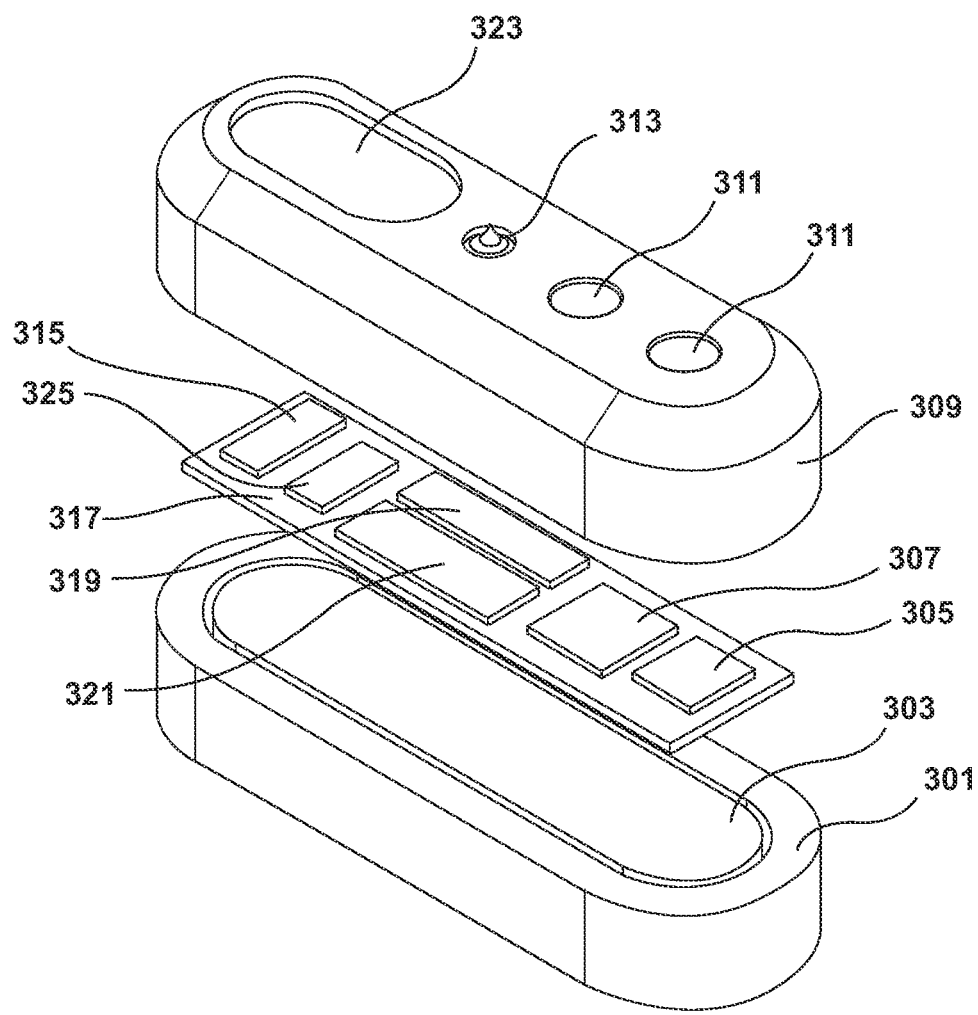
FIG. 3 is an exploded view of the core system of FIG. 2.

Illustrated in FIG. 3 is the exploded view of the core system or device 201. In the embodiment of FIG. 3, the core system or device 201 comprises a lower housing 301, an energy storage module 303, a cellular antenna 305, a power management module 307, an upper housing 309, buttons 311, light 313, a processor 315, a printed circuit board 317, an analog to digital converter 319, a memory and internal clock 321, a solar cell 323, and a Bluetooth Low Energy (BLE) antenna 325.

Illustrated in FIG. 3 is the upper housing 309 of the core system or device 201, which upper housing 309 encapsulates components of the core system 201 including, but not limited to, buttons 311 and lights 313 and presents a human-machine interface. The lights 313 on the upper housing 309 provide visual feedback for the user including, but not limited to, system power indication, successful connection indication, fault indication, and low energy management module indication. The buttons 311 on the upper housing 309 provide a means for the user to conduct system functions including, but not limited to, powering up, restarting, resetting, calibrating, or powering down the core system 201.

The upper housing 309 also encapsulates the solar cell 323. The solar cell converts energy from the sun into electricity. The electricity generated is stored in the energy storage module 303. As understood in the art, the solar cell may alternatively be a separate part of the system 101 and not integral with the core system 201. Said differently, the system may include a solar panel comprising the solar cell separate from the core system 201, which solar cell is in electrical communication with the core system 201. Further still, the system 101 may be powered via alternative power sources, e.g. a battery, a public utility, a generator, etc.

Illustrated in FIG. 3 is the lower housing 301 of the core system 201. The lower housing 301 encapsulates the energy storage module 303. The energy storage module 303 may be a battery, super-capacitor, or combination of both.

The bottom of the lower housing 301 is typically the portion of the system 101 and/or core system 201 that mounts to the storage container being monitored. The core system 201 may be magnetically affixed to the storage container or held in place with fasteners or an adhesive. In another embodiment, the system 101 is not physically attached to the storage container but is adjacent the storage container.

Illustrated in FIG. 3 is the power management module 307 which converts and manages the energy stored in the energy management module 303 to provide energy to the system 101, including electronics, during system processes and use. The power management module 307 is also responsible for storing the energy generated by the solar cell, when utilized, into the energy storage module 303. The power management module 307 reads the energy level of the energy storage module 303 from the sensor 205 and transmits this information to the processor 315.

Figure 4:
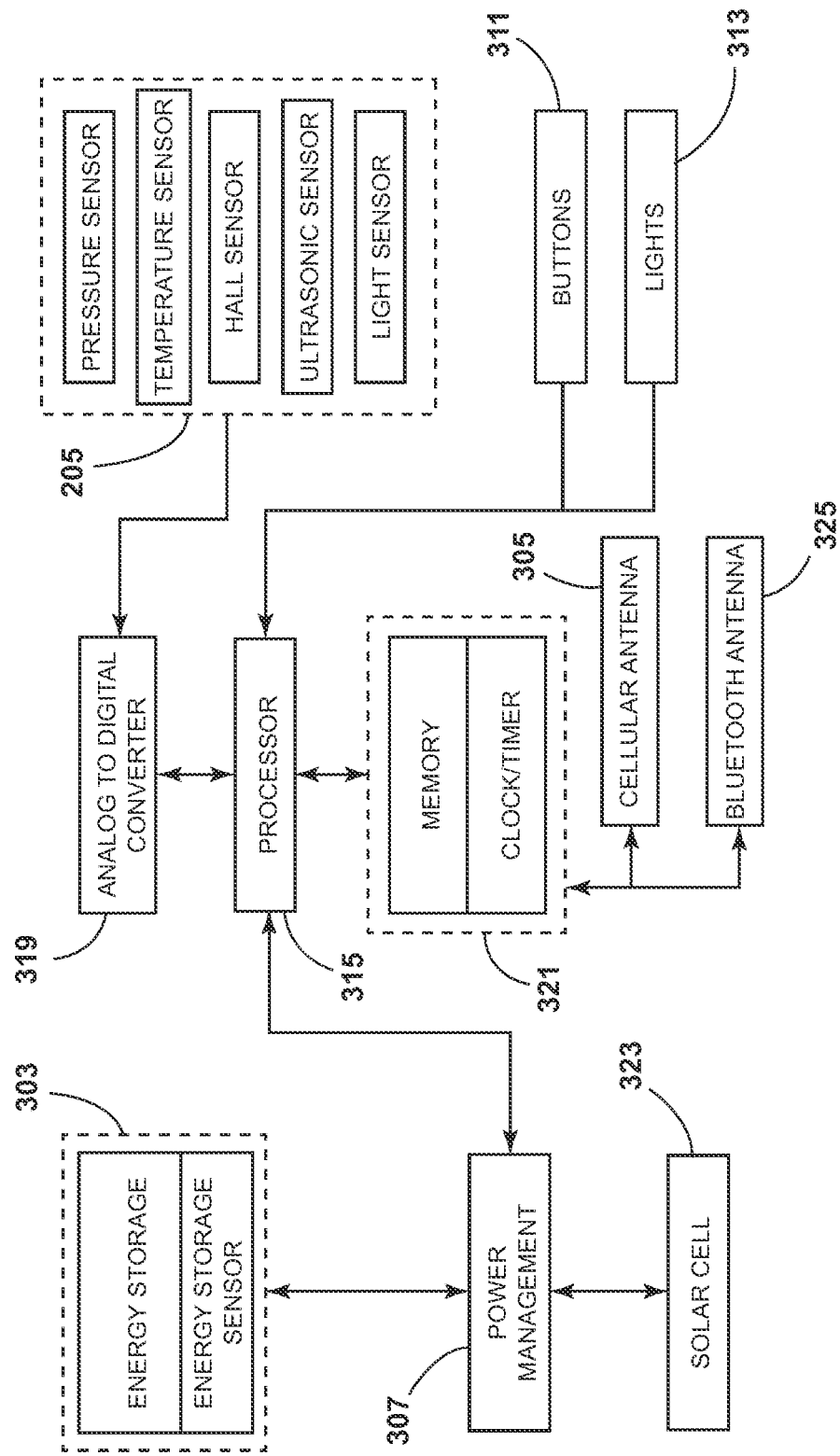
FIG. 4 is a schematic and diagrammatic view of internal electrical components of the monitoring system of FIG. 1 and their interaction.

Illustrated in FIG. 4 is a diagram of how the internal components of the system 101 interact with each other in an exemplary embodiment. When the system 101 exits sleep mode, and performs the MQTT publish cycle, the analog signal from the sensor 205 (if not generated as a digital signal by the sensor 205) is converted to a digital signal via an analog to digital converter 319. If the signal generated by the sensor 205 is a digital signal, there is no need to utilize the analog to digital converter 319 or convert the analog signal into a digital signal. However, it's typical that the signal generated by the sensor 205 is an analog signal. This converted sensor signal is then processed by the processor and packaged into a data file, such as a JSON file. System information, such as scheduled MQTT publish cycles, error or fault codes, and the energy storage sensor reading 303, are also packaged into the data file. Once the data file is created, it is stored in the memory of the system 321 and then transmitted to the cellular network via the cellular antenna 305.

As illustrated in FIG. 4, the sensor 205 can comprise a single sensor, or a combination of sensors, including, but not limited to, a pressure sensor, temperature sensor, hall sensor, ultrasonic sensor, and light sensor. As readily understood in the art, the sensor 205 can be selected based on the particular fluid or commodity to be monitored via the system. For example, the sensor can measure fluid pressure (either a liquid or vapor pressure), a fluid level, etc.

Figure 5:
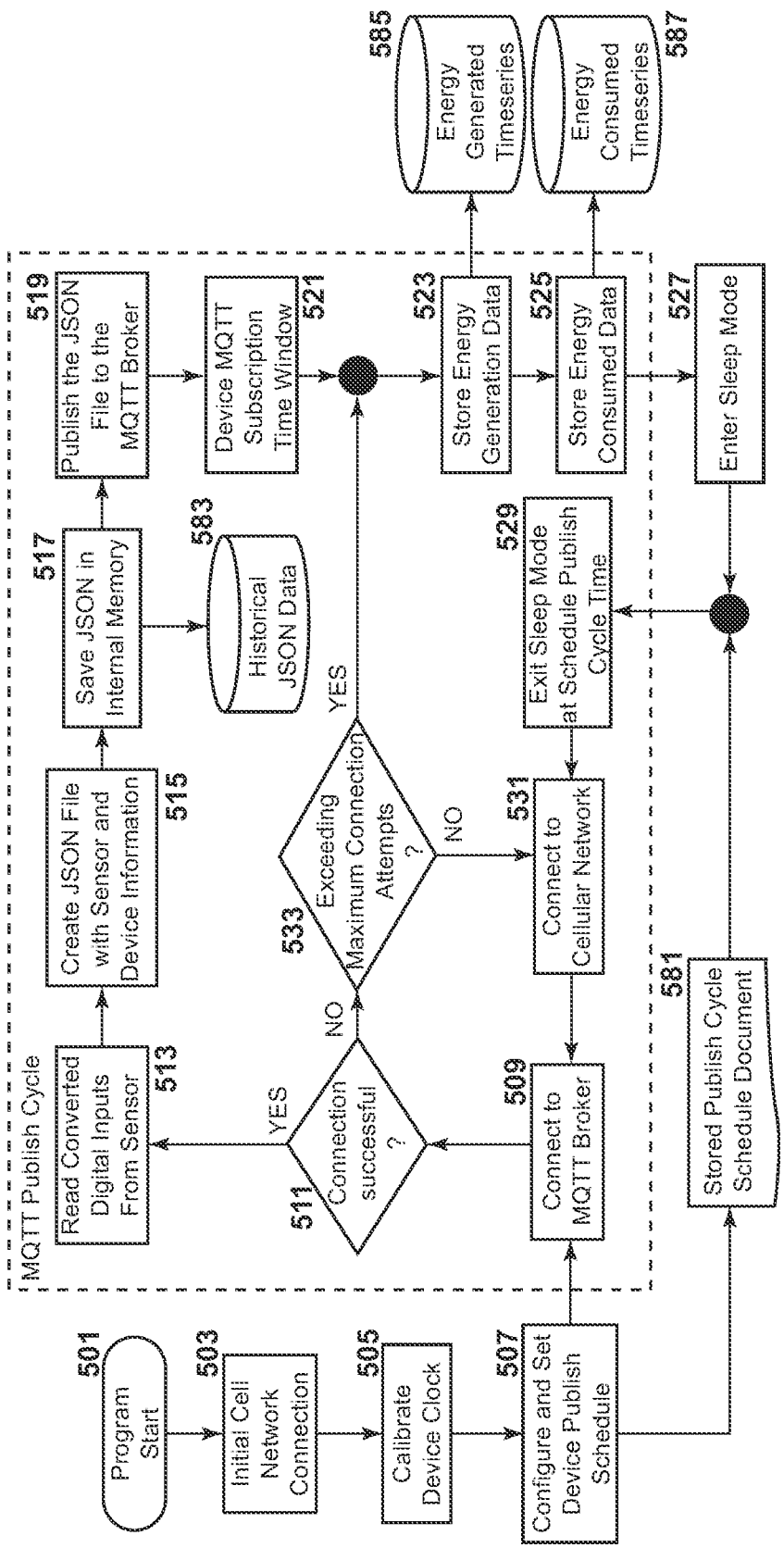
FIG. 5 is a flow diagram detailing a method according to one embodiment of the invention.

Illustrated in FIG. 5 is a flow chart diagram of the MQTT publish cycle program of the system 101. This program is stored in the memory of the system 321 and is compiled by the processor of the system 315.

As illustrated in FIG. 5, the first process of the program is to connect the system to the cellular network 503. Once the system is connected, the system clock is calibrated to match current Universal Time (UTC) 505. Once the time clock is calibrated, the MQTT publishing cycle schedule of the system is configured and set 507 in the system memory 581. The system then connects to the MQTT broker 509, initiating the first MQTT publish cycle. If the connection is successful 511, the system reads the converted digital inputs from the sensor 513 and compiles the sensor and system data into a JSON file 515. The JSON file is stored to the system's internal memory 583, and then published to the MQTT broker 519 via the cellular network.

Once the JSON file is published to the MQTT broker, the system enters an MQTT broker subscription time window, where it waits until it receives confirmation from the broker that its published JSON file has been received, and that the system is cleared to enter sleep mode 521. During this process 521, the system may also be directed to start a software update, recalibrate the system time clock, or to reconfigure its MQTT sleep and publish cycle schedule, instead of, or prior to, entering sleep mode.

Once the published JSON file is confirmed 521, the system calculates and stores the energy generation data 523 between the previous and current publish cycle into the memory 585 as a timeseries. Subsequently, the system stores the energy consumption data 525 between the previous and current publish cycle into the memory 587 as a timeseries.

After storing energy consumption data 525, system enters sleep mode 527, the system's clock counts down the time until it reaches the next scheduled MQTT publish cycle 581. Once the scheduled time is reached, the system wakes up and starts a new MQTT publish cycle 529

The first process in the MQTT publish cycle involves the system connecting to the cellular network 531, followed by connecting to the MQTT broker 509. If the connection is successful, the system moves on to the next process. However, if the connection is unsuccessful, the system attempts to re-connect with the cellular network and MQTT broker. The system also has a predetermined number of connection attempts allowed during one MQTT publish cycle. If the number of attempts exceeds the maximum number of pre-determined connection attempts 533, the system skips the rest of the MQTT publish cycle and enters sleep mode 527 until the next scheduled publish cycle.

The MQTT publish cycle described in FIG. 5 continues indefinitely until the user stops the process using the buttons 311, or the system receives a message, via the MQTT broker 705, that it must stop the MQTT publishing cycle of the system.

Figure 6:
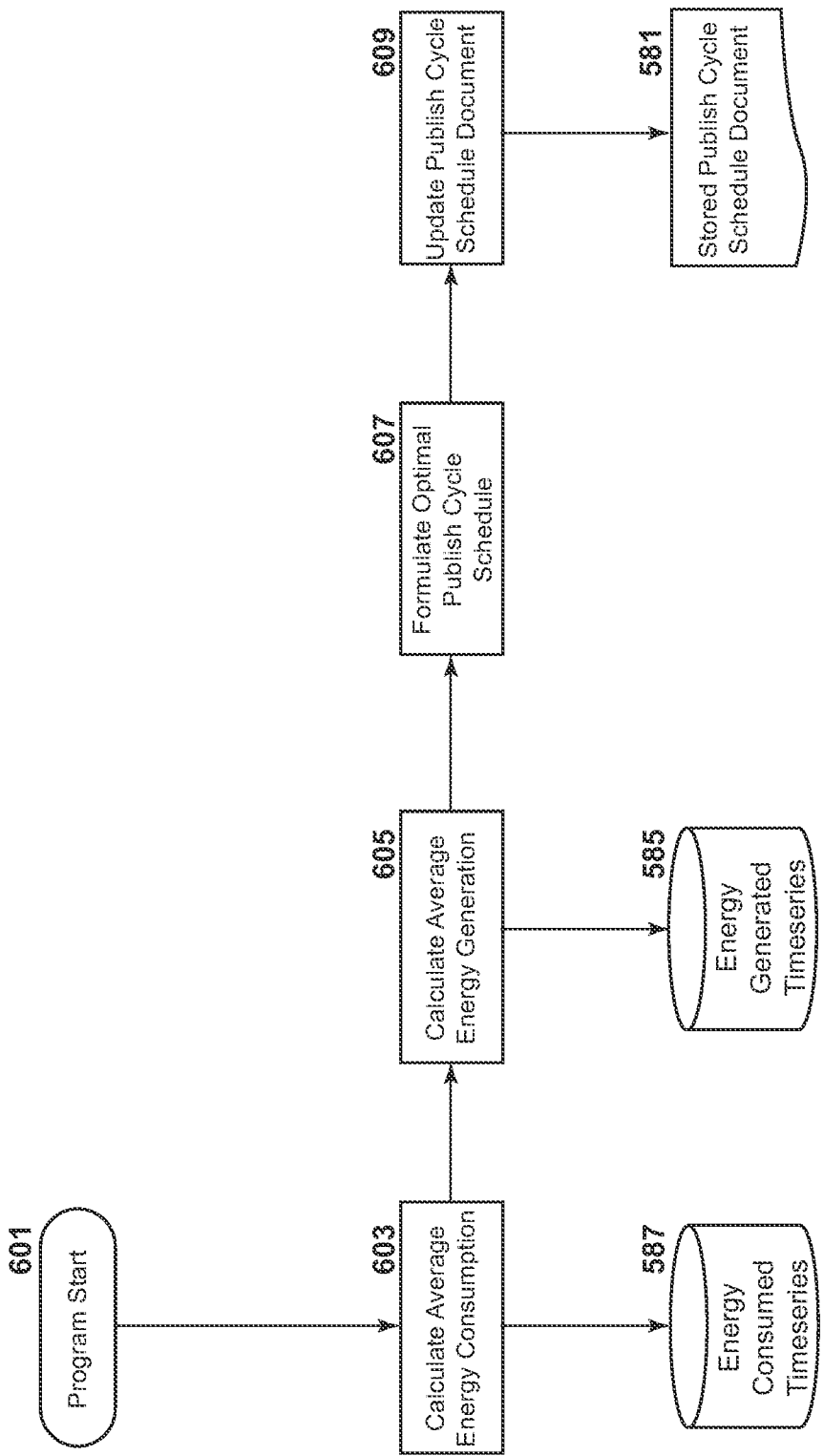
FIG. 6 is a flow diagram detailing a method with which the monitoring system determines an optimal data publishing schedule based on energy consumption and generation data.

Illustrated in FIG. 6 is the flow chart diagram of the program that is responsible for optimizing the publishing cycle schedule of the system 101. The program is running in parallel to the MQTT publish cycle program. The program calculates the average energy usage 603 over a pre-determined time period. It calculates the average energy usage using the data in the energy consumed timeseries database 587 stored in the system's memory 321. The program then calculates the average energy generated 605 by the solar cell 323 over a pre-determined time period. It calculates the average energy generated using the data stored in the energy generated timeseries database 585. Once the average energy consumption and generation is determined, the program calculates the optimal publishing cycle schedule over a set time period using a combination of mathematical equations and machine learning methods 607. Once the optimal publishing schedule has been determined, the program updates the publish cycle schedule document 581 stored in the system's memory 321.

Figure 7:
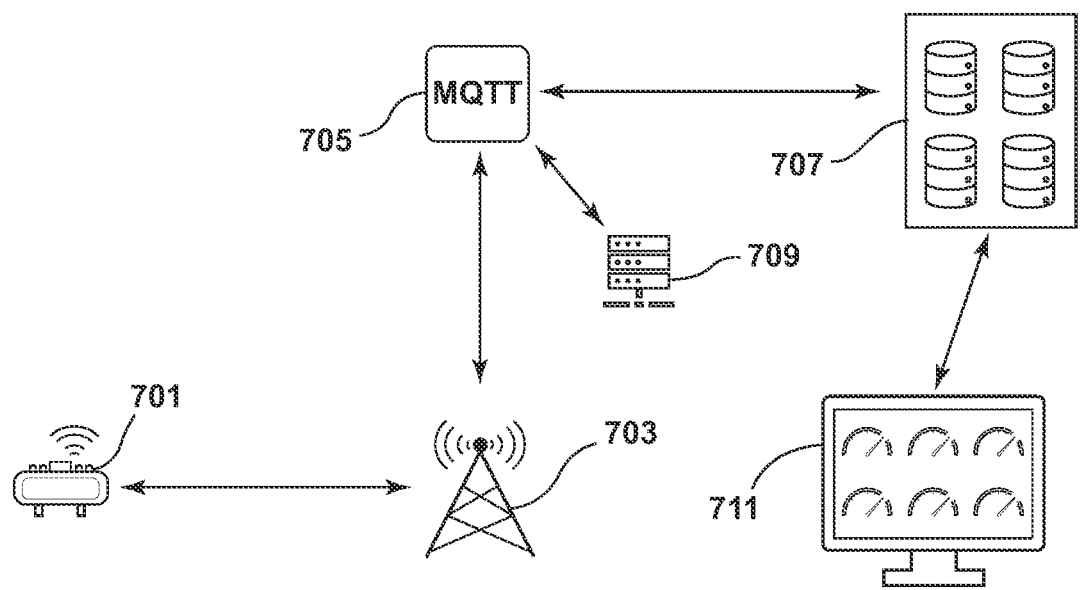
FIG. 7 is a schematic and diagrammatic view of a system according to one embodiment of the invention.

Illustrated in FIG. 7 is a schematic and diagrammatic view of the solar powered connected monitoring system 101 where cellular communication 703, MQTT Broker 705, master controller 709, database 707, and web application 711 is employed. The 500-gallon residential propane container 701 is illustrated as an example of a container that is monitored by the system 101. The information measured at the storage container by the system 101 is transmitted via cellular network to the cellular tower 703. From there, the information is published to a specific topic in the MQTT broker 705. Once data is published to a specific topic in the MQTT broker 705, subscribed systems, such as the master controller 709 and database 707, are capable of viewing and storing the published data. The MQTT broker allows multiple systems 101 to publish data to unique or general topics.

The database 707 is subscribed to the topics in the MQTT broker and stores all of the published JSON files. The information stored is then accessed by a web application 711 where it can be visually displayed on a phone, tablet, or computer for access by the user.

Figure 8:
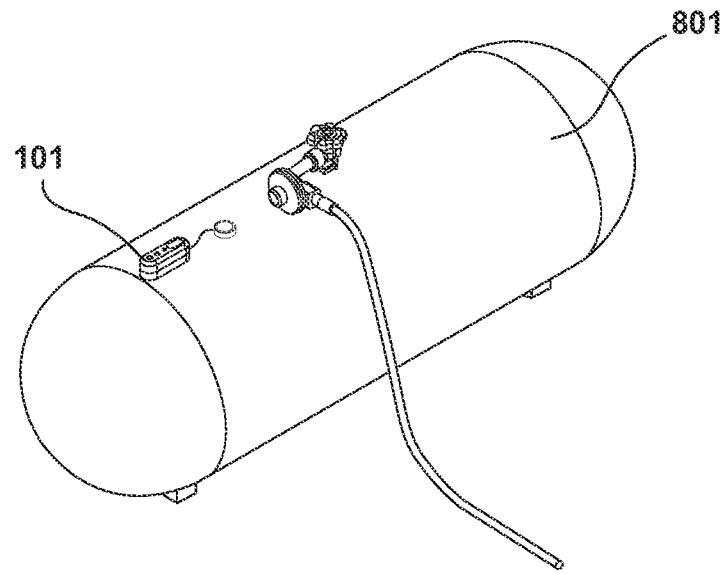
FIG. 8 shows the monitoring system affixed to a residential 500-gallon propane tank.

Illustrated in FIG. 8 is the system 101 installed on a 500-gallon residential propane container 801. In the embodiment of FIG. 8, the sensor 205 of the system 101 replaces the fluid level gauge of the container.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method for monitoring an amount of a commodity in a remote storage container via a system, said method comprising:
   (i) measuring via a sensor the amount of the commodity in the remote storage container and outputting an analog or digital signal, wherein if the signal outputted by the sensor is an analog signal, the method further comprises converting the analog signal to a digital signal;
   (ii) packaging the digital signal into a data file;
   (iii) publishing via a wireless connection the data file to a message query telemetry transport (MQTT) broker for access by a user;
   (iv) receiving confirmation that the MQTT broker received the data file;
   (v) accessing by the user information from the data file; and
   (vi) repeating steps (i) to (v) after a predetermined time;
   wherein the system further comprises a solar cell;
   wherein the method further includes storing as a timeseries energy generation data including an amount of energy generated by the solar cell over each of a series of time periods, each time period being an amount of time that is between a current step (iii) and a step (iii) immediately preceding the current step (iii), and storing as a timeseries energy consumption data including an amount of energy usage of the system over each of the series of said time periods;
   wherein after receiving confirmation that the MQTT broker received the data file, the method further comprises putting the system into a sleep mode for the predetermined time prior to (vi) repeating steps (i) to (v);
   wherein the method cycles between steps (i) to (v) and the sleep mode based on a determined schedule, the determined schedule is determined by a machine learning algorithm based on a calculation of an average energy generated by the solar cell using the timeseries stored in the energy generation data and a calculation of an average energy usage using the timeseries stored in the energy consumption data, and the method further comprises determining an optimum determined schedule by the machine learning algorithm.

2. The method of claim 1 wherein the method further comprises generating energy with the solar cell to power the system.

3. The method of claim 2, wherein the system further comprises an energy storage module and the method further comprises storing energy generated from the solar cell in the energy storage module.

4. The method of claim 3, wherein the system further comprises a power management module for measuring an energy level of the energy storage module and for providing power to the system.

5. The method of claim 1, wherein the sensor is one selected from a group consisting of: (i) a pressure sensor, (ii) a temperature sensor, (iii) a hall sensor, (iv) an ultrasonic sensor, (v) a light sensor, and (vi) any combination of (i) through (v).

6. The method of claim 1, wherein the system further comprises a processor for packaging the digital signal into a data file, and wherein the data file comprises a JavaScript Object Notation (JSON) file.

7. The method of claim 1, wherein the system further comprises a cellular antenna, and wherein publishing via the wireless connection the data file comprises transmitting the data file via a cellular network.

8. The method of claim 1, wherein the commodity is a fluid, and wherein monitoring the amount of the fluid comprises monitoring a level or a pressure of the fluid in the remote storage container.

9. The method of claim 8, wherein the liquid is propane, and wherein the remote storage container is a propane tank.

10. The method of claim 1, wherein the system further comprises a Bluetooth low energy module, and is capable of local wireless communication therewith.

11. The method of claim 1, wherein the system further comprises a human-machine interface for installation and use.

12. A system capable of performing the method of claim 1.

\* \* \* \* \*